United States Patent
Miao et al.

(10) Patent No.: US 11,684,973 B2
(45) Date of Patent: Jun. 27, 2023

(54) METHOD FOR PRODUCING AN ABRASION-RESISTANT COATING ON SURFACE OF 3D PRINTED TITANIUM ALLOY COMPONENTS

(71) Applicant: Jiangnan University, Wuxi (CN)

(72) Inventors: Xiaojin Miao, Wuxi (CN); Meiping Wu, Wuxi (CN); Peipei Lu, Wuxi (CN); Xiu Ye, Wuxi (CN); Hang Wang, Wuxi (CN); Xin Liu, Wuxi (CN)

(73) Assignee: Jiangnan University, Wuxi (CN)

(*) Notice: Subject to any disclaimer, the term of this patent is extended or adjusted under 35 U.S.C. 154(b) by 323 days.

(21) Appl. No.: 17/001,618

(22) Filed: Aug. 24, 2020

(65) Prior Publication Data
US 2021/0078079 A1 Mar. 18, 2021

(30) Foreign Application Priority Data

Sep. 16, 2019 (CN) .......................... 201910868266.0

(51) Int. Cl.
| | |
|---|---|
| *B22F 3/24* | (2006.01) |
| *B33Y 10/00* | (2015.01) |
| *B33Y 70/00* | (2020.01) |
| *B33Y 40/20* | (2020.01) |
| *B22F 10/28* | (2021.01) |
| *B22F 10/68* | (2021.01) |
| *C23C 24/06* | (2006.01) |
| *B33Y 80/00* | (2015.01) |
| *B22F 10/00* | (2021.01) |
| *B22F 9/08* | (2006.01) |

(52) U.S. Cl.
CPC .............. *B22F 3/24* (2013.01); *B22F 9/082* (2013.01); *B22F 10/00* (2021.01); *B22F 10/28* (2021.01); *B22F 10/68* (2021.01); *B33Y 10/00* (2014.12); *B33Y 40/20* (2020.01); *B33Y 70/00* (2014.12); *B33Y 80/00* (2014.12); *C23C 24/06* (2013.01); *B22F 2003/242* (2013.01); *B22F 2003/247* (2013.01); *B22F 2003/248* (2013.01); *B22F 2009/0836* (2013.01); *B22F 2301/205* (2013.01); *B22F 2303/30* (2013.01); *B22F 2304/10* (2013.01)

(58) Field of Classification Search
CPC .............. B22F 2003/242; B22F 10/28; B22F 2301/205; C23C 24/06
See application file for complete search history.

(56) References Cited

FOREIGN PATENT DOCUMENTS

| CN | 105355927 A | * | 2/2016 | |
|---|---|---|---|---|
| CN | 106825552 A | * | 6/2017 | |
| CN | 106987789 A | * | 7/2017 | ............. C23C 24/06 |
| CN | 110846650 A | * | 2/2020 | ............. C23C 24/06 |

OTHER PUBLICATIONS

Sadeghi, M., M. Kharaziha, and H. R. Salimijazi. "Double layer graphene oxide-PVP coatings on the textured Ti6Al4V for improvement of frictional and biological behavior." Surface and Coatings Technology 374 (2019): 656-665 (Year: 2019).*

Wang, Chenchen, et al. "Microtribological properties of Ti6Al4V alloy treated with self-assembled dopamine and graphene oxide coatings." Tribology International 137 (2019): 46-58 (Year: 2019).*

* cited by examiner

*Primary Examiner* — Anthony J Zimmer
*Assistant Examiner* — Sean P. O'Keefe
(74) *Attorney, Agent, or Firm* — Idea Intellectual Limited; Margaret A. Burke; Sam T. Yip

(57) ABSTRACT

The present invention relates to a method for producing an abrasion-resistant coating on surface of a 3D printed titanium alloy component, which belongs to the field of surface modification. The method comprises using spherical TC4 titanium alloy powder as a base material and adopting selective laser melting (SLM) technology to manufacture a 3D printed titanium alloy component in a layer-by-layer stacking manner, using graphene oxide to perform friction-induction treatment, and making the graphene oxide infiltrate into the surface of the TC4 titanium alloy component to obtain a graphene oxide surface coating. The goal of improving the friction and wear performance of the TC4 titanium alloy printed components is achieved. The preparation method is simple, and the steps are easy to operate. Introducing the graphene oxide is beneficial to reduce the generation of wear debris during the friction and wear processes and improve tribological characteristics of the base material.

7 Claims, No Drawings

METHOD FOR PRODUCING AN ABRASION-RESISTANT COATING ON SURFACE OF 3D PRINTED TITANIUM ALLOY COMPONENTS

CROSS-REFERENCES TO RELATED APPLICATIONS

This application claims priority to Chinese patent application No. 2019108682660 filed on Sep. 16, 2019, and the disclosure of which is incorporated herein by reference in its entirety.

FIELD OF THE INVENTION

The invention relates to a method for producing an abrasion-resistant coating on surface of a 3D printed titanium alloy component, which belongs to the technical field of material surface modification.

BACKGROUND OF THE INVENTION

Titanium alloy (TC4) has been widely used in aerospace, chemistry, biomedicine and many other fields for high specific strength, excellent corrosion resistance and biocompatibility. However, in the process of long-term implementation, surface of titanium alloy has poor tribological performance, and high and unstable friction coefficient, which greatly limits application and development of titanium alloy. At present, the research on improving the tribological performance of titanium alloys mainly uses surface modification methods, such as laser cladding, magnetron sputtering, ion implantation, etc. The tribological performance is improved mainly by forming an abrasion-resistant coating on the surface of the titanium alloy, but the above modification methods will inevitably bring negative effects on the matrix while changing the surface structure of the titanium alloy (e.g. increased thermal stress and sample deformation). Therefore, on the basis of retaining the original excellent properties of the titanium alloy, the surface tribological characteristics of TC4 titanium alloy printed components can be further improved by using some cold working surface modification methods, which is of great significance for further applications of the titanium alloy materials.

SUMMARY OF THE INVENTION

To solve the technical problems as above-mentioned, the present invention provides a method for producing an abrasion-resistant coating on surface of a 3D printed titanium alloy component (or sample). The preparation method is simple, and the steps are easy to operate.

The present invention provides the following solutions: a method for producing an abrasion-resistant coating on the surface of a 3D printed titanium alloy sample, including the following steps:

(1) Treatment of TC4 titanium alloy powder: using spherical TC4 titanium alloy powder with particle size of 4-70 μm as a printing material, where the TC4 titanium alloy powder has a particle size of 4-70 μm, and putting the spherical TC4 titanium alloy powder in a vacuum drying oven for drying treatment to obtain sufficiently dried TC4 titanium alloy powder;

(2) Preparation of 3D printed titanium alloy sample: adding the dried TC4 titanium alloy powder into a powder supplying bin of a selective laser melting (SLM) 3D printer, setting reasonable laser scanning parameters, laser-scanning and stacking the TC4 titanium alloy powder layer by layer until a sample is formed, and then peeling off the formed sample and polishing and cleaning the formed sample to obtain a 3D printed titanium alloy sample;

(3) Treatment of graphene oxide powder: drying graphene oxide powder and adding the dried graphene oxide on top of a friction-induction tool, applying a pre-compression pressure of 5-10 N/m$^2$ for 3-5 min on the graphene oxide powder to make it tightly and evenly spread on top of the friction-induction tool;

(4) Friction-induction process: fixing the 3D printed titanium alloy sample obtained in the step (2) on a friction and wear testing machine and pressing the friction-induction tool tightly on the surface of the 3D printed titanium alloy sample under a working pressure, and then performing reciprocating friction-induction operations along the planned path to infiltrate the graphene oxide powder into the 3D printed titanium alloy sample; and (5) Post-treatment process: washing the sample obtained in the step (4) with deionized water and blow-drying it with a blow-dryer.

Further, the temperature of the vacuum drying oven in the step (1) is 100-120° C., and the drying time is 2.5-3.5 hours.

Further, the laser scanning parameters in the step (2) include 180-220 W laser power, 1200-1400 mm/s scan speed, 110-150 μm scan pitch and 28-32 μm scan thickness.

Further, argon gas is used for protection during the forming process of the 3D printed titanium alloy sample, and wire cutting process is adopted to peel off the formed sample.

Further, the formed sample in the step (2) is polished with an alumina polishing solution, washed with an ethanol solution and dried.

Further, the 3D printed titanium alloy sample in the step (2) is ground with 1000 grit, 1200 grit, 1500 grit and 2000 grit sandpapers in sequence.

Further, the pre-compression pressure is 5-10 N/m$^2$, and the working pressure is 12-15 N/m$^2$.

The present invention has the following advantages: graphene oxide has a two-dimensional structure of a single atomic layer and excellent mechanical properties, so the friction force in the friction-induction process makes the graphene oxide stack in a layered form on the surface of the titanium alloy base material, reducing wear debris and improving tribological characteristics of the base material. In the present invention, the friction-induction process can induce the graphene oxide to be infiltrated into the surface of the titanium alloy printed components fully use the excellent quality of graphene oxide to increase the tribological characteristics of 3D printed titanium alloy components while retaining the originally excellent properties of titanium alloy. Eventually, a graphene oxide coated 3D printed titanium alloy material with good surface abrasion resistance is obtained.

DETAILED DESCRIPTION

The following description accompanied with examples illustrate the embodiments of the present invention.

The present invention provides the following solutions: a method for producing an abrasion-resistant coating on the surface of a 3D printed titanium alloy sample, including the following steps:

(1) Treatment of TC4 titanium alloy powder: using spherical TC4 titanium alloy powder with particle size of 4-70 μm as a printing material, where the TC4 titanium alloy powder has a particle size of 4-70 μm, and putting the spherical TC4 titanium alloy powder in a vacuum drying oven for drying treatment to obtain sufficiently dried TC4 titanium alloy powder;

(2) Preparation of 3D printed titanium alloy sample: adding the dried TC4 titanium alloy powder into a powder supplying bin of a selective laser melting (SLM) 3D printer, setting reasonable laser scanning parameters, laser-scanning and stacking the TC4 titanium alloy powder layer by layer until a sample is formed, and then peeling off the formed sample and polishing and cleaning the formed sample to obtain a 3D printed titanium alloy sample;

(3) Treatment of graphene oxide powder: drying graphene oxide powder and adding the dried graphene oxide on top of a friction-induction tool, applying a pre-compression pressure of 5-10 N/m$^2$ for 3-5 min on the graphene oxide powder to make it tightly and evenly spread on top of the friction-induction tool;

(4) Friction-induction process: fixing the 3D printed titanium alloy sample obtained in the step (2) on a friction and wear testing machine and pressing the friction-induction tool tightly on the surface of the 3D printed titanium alloy sample under a working pressure of 12-15 N/m$^2$, and then performing reciprocating friction-induction operations along a planned path to infiltrate the graphene oxide powder into the 3D printed titanium alloy sample to form an abrasion-resistant coating; and (5) Post-treatment process: washing the sample obtained in the step (4) with deionized water and blow-drying it with a blow-dryer.

In one embodiment, the temperature of the vacuum drying oven is 100-120° C., and the drying time is 2.5-3.5 hours.

In one embodiment, the laser scanning parameters comprise 180-220 W laser power, 1200-1400 mm/s scan speed, 110-150 μm scan pitch and 28-32 μm scan thickness.

In one embodiment, the laser scanning parameters comprise 180-220 W laser power, 1200-1400 mm/s scan speed, 110-150 μm scan pitch and 28-32 μm scan thickness.

In one embodiment, argon gas is used for protection during the forming of the 3D printed titanium alloy component, and wire cutting process is adopted to peel off the formed component.

In one embodiment, the formed component is polished with an alumina polishing solution, washed with an ethanol solution and dried.

In one embodiment, the 3D printed titanium alloy component is ground with 1000 grit, 1200 grit, 1500 grit and 2000 grit sandpapers in sequence In one embodiment, the pre-compression pressure is 5-10 N/m$^2$, and the working pressure is 12-15 N/m$^2$.

In one embodiment, the spherical TC4 titanium alloy powder is manufactured by a plasma atomization process.

EXAMPLE

Example 1

A method for producing an abrasion-resistant coating on the surface of a 3D printed titanium alloy component (or sample), including the following steps:

(1) Treatment of TC4 titanium alloy powder: using spherical TC4 titanium alloy powder with particle size of 4-70 μm as a printing material and putting the spherical TC4 titanium alloy powder in a vacuum drying oven for drying treatment to obtain sufficiently dried TC4 titanium alloy powder, where the temperature of the vacuum drying oven is 100° C., and the drying time is 3.5 hours;

(2) 3D printed titanium alloy sample preparation: adding the dried TC4 titanium alloy powder into a powder supply bin of a selective laser melting (SLM) 3D printer, setting reasonable laser scanning parameters including 180 W of laser power, 1400 mm/s of scan speed, 110 μm of scan pitch and 32 μm of scan thickness. Next step, laser-scanning and stacking the TC4 titanium alloy powder layer by layer until a sample is formed, and then peeling off the formed sample and polishing and cleaning the formed sample to obtain a 3D printed titanium alloy sample. During the forming process of the 3D printed titanium alloy sample, argon gas is used for protection, and wire cutting process is adopted to peel off the formed sample. The formed sample is polished with an alumina polishing solution, washed with an ethanol solution and dried. Next step, the 3D printed titanium alloy sample is ground with 1000 grit, 1200 grit, 1500 grit and 2000 grit sandpapers in sequence;

(3) Treatment of graphene oxide powder: drying graphene oxide powder and adding the dried graphene oxide to the inside of a friction-induction tool, applying a pre-compression pressure of 5 N/m$^2$ for 5 min on the graphene oxide powder to make it tightly and evenly spread on top of the friction-induction tool;

(4) Friction-induction process: fixing the 3D printed titanium alloy sample obtained in the step (2) on a friction and wear testing machine and pressing the friction-induction tool tightly on the surface of the 3D printed titanium alloy sample under a working pressure, and then performing reciprocating friction-induction operations along the planned path to infiltrate the graphene oxide powder into the 3D printed titanium alloy sample; and (5) Post-treatment process: washing the sample obtained in the step (4) with deionized water and blow-drying it with a blow-dryer, where the pre-pressing pressure for powder at the top of the friction-induction tool is 5 N/m$^2$, and the working pressure is 15 N/m$^2$.

Example 2

A method for producing an abrasion-resistant coating on the surface of a 3D printed titanium alloy component (or sample), including the following steps:

(1) Treatment of TC4 titanium alloy powder: using spherical TC4 titanium alloy powder with particle size of 4-70 μm as a printing material and putting the spherical TC4 titanium alloy powder in a vacuum drying oven for drying treatment to obtain sufficiently dried TC4 titanium alloy powder, where the temperature of the vacuum drying oven is 110° C., and the drying time is 3 hours;

(2) 3D printed titanium alloy sample preparation: adding the dried TC4 titanium alloy powder into a powder supply bin of a selective laser melting (SLM) 3D printer, setting reasonable laser scanning parameters including 200 W of laser power, 1300 mm/s of scan speed, 120 μm of scan pitch and 30 μm of scan thickness. Next step, laser-scanning and stacking the TC4 titanium alloy powder layer by layer until a sample is formed, and then peeling off the formed sample and polishing and cleaning the formed sample to obtain a 3D printed titanium alloy sample. During the forming process of the 3D printed titanium alloy sample, argon gas is used for protection, and wire cutting process is adopted to peel off the formed sample. The formed sample is polished with an alumina polishing solution, washed with an ethanol solution and dried. Next step, the 3D printed titanium alloy sample is ground with 1000 grit, 1200 grit, 1500 grit and 2000 grit sandpapers in sequence;

(3) Treatment of graphene oxide powder: drying graphene oxide powder and adding the dry graphene oxide to the inside of a friction-induction tool, applying a pre-compression pressure of 8 N/m² for 4 min on the graphene oxide powder to make it tightly and evenly spreads on top of the friction-induction tool;

(4) Friction-induction process: fixing the 3D printed titanium alloy sample obtained in the step (2) on a friction and wear testing machine and pressing the friction-induction tool tightly on the surface of the 3D printed titanium alloy sample under a working pressure, and then performing reciprocating friction-induction operations along the planned path to infiltrate the graphene oxide powder into the 3D printed titanium alloy sample; and (5) Post-treatment process: washing the sample obtained in the step (4) with deionized water and blow-drying it with a blow-dryer, where the pre-pressing pressure for powder at the top of the friction-induction tool is 8 N/m², and the working pressure is 10 N/m².

Example 3

A method for producing an abrasion-resistant coating on the surface of a 3D printed titanium alloy component (or sample), including the following steps:

(1) Treatment of TC4 titanium alloy powder: using spherical TC4 titanium alloy powder as a printing material, where the TC4 titanium alloy powder has a particle size of 4-70 μm, and being put in a vacuum drying oven for drying treatment to obtain sufficiently dried TC4 titanium alloy powder, where the temperature of the vacuum drying oven is 120° C., and the drying time is 2.5 hours;

(2) 3D printed titanium alloy sample preparation: adding the dried TC4 titanium alloy powder into a powder supply bin of a selective laser melting (SLM) 3D printer, setting reasonable laser scanning parameters including 180-220 W of laser power, 1200 mm/s of scan speed, 150 μm of scan pitch and 28 μm of scan thickness. Next step, laser-scanning and stacking the TC4 titanium alloy powder layer by layer until a sample is formed, and then peeling off the formed sample and polishing and cleaning the formed sample to obtain a 3D printed titanium alloy sample. During the forming process of the 3D printed titanium alloy sample, argon gas is used for protection, and wire cutting process is adopted to peel off the formed sample. The formed sample is polished with an alumina polishing solution, washed with an ethanol solution and dried. Next step, the 3D printed titanium alloy sample is ground with 1000 grit, 1200 grit, 1500 grit and 2000 grit sandpapers in sequence;

(3) Treatment of graphene oxide powder: drying graphene oxide powder and adding the dried graphene oxide to the inside of a friction-induction tool, applying a pre-compression pressure of 10 N/m² for 3 min on the graphene oxide powder to make it tightly and evenly spreads on top of the friction-induction tool;

(4) Friction-induction process: fixing the 3D printed titanium alloy sample obtained in the step (2) on a friction and wear testing machine and pressing the friction-induction tool tightly on the surface of the 3D printed titanium alloy sample under a working pressure, and then performing reciprocating friction-induction operations along the planned path to infiltrate the graphene oxide powder into the 3D printed titanium alloy sample; and (5) Post-treatment process: washing the sample obtained in the step (4) with deionized water and blow-drying it with a blow-dryer, where the pre-pressing pressure for powder at the top of the friction-induction tool is 10 N/m², and the working pressure is 12 N/m².

What is claimed is:

1. A method for producing an abrasion-resistant coating on surface of a three-dimensional (3D) printed titanium alloy component, comprising:
   using spherical TC4 titanium alloy powder with particle size of 4-70 μm as a printing material, and putting the spherical TC4 titanium alloy powder in a vacuum drying oven for a drying treatment to obtain dried TC4 titanium alloy powder;
   adding the dried TC4 titanium alloy powder into a powder supplying bin of a selective laser melting (SLM) 3D printer, setting reasonable laser scanning parameters, laser-scanning and stacking the TC4 titanium alloy powder layer by layer until a component is formed, and then peeling off the formed component and polishing and cleaning the formed component to obtain a 3D printed titanium alloy component;
   drying graphene oxide powder and adding the dried graphene oxide powder on top of a friction-induction tool and applying a pre-compression pressure of 5-10 N/m² for 3-5 minutes on the graphene oxide powder to spread the graphene oxide powder on top of the friction-induction tool;
   fixing the 3D printed titanium alloy component on a friction and wear testing machine and pressing the friction-induction tool on the surface of the 3D printed titanium alloy component under a working pressure of 12-15 N/m², and then performing reciprocating friction-induction operations along a planned path to infiltrate the graphene oxide powder into the 3D printed titanium alloy component to form an abrasion-resistant coating; and
   washing the component with deionized water and blow-drying the component with a blow-dryer.

2. The method for producing an abrasion-resistant coating on surface of a 3D printed titanium alloy component according to claim 1, wherein the drying treatment is carried out at 100-120° C. for 2.5-3.5 hours.

3. The method for producing an abrasion-resistant coating on surface of a 3D printed titanium alloy component according to claim 1, wherein the laser scanning parameters comprise 180-220 W laser power, 1200-1400 mm/s scan speed, 110-150 μm scan pitch and 28-32 μm scan thickness.

4. The method for producing an abrasion-resistant coating on surface of a 3D printed titanium alloy component according to claim 1, wherein wire cutting process is adopted to peel off the formed component.

5. The method for producing an abrasion-resistant coating on surface of a 3D printed titanium alloy component according to claim 1, wherein the formed component is polished with an alumina polishing solution, washed with an ethanol solution and dried.

6. The method for producing an abrasion-resistant coating on surface of a 3D printed titanium alloy component according to claim 1, wherein the 3D printed titanium alloy component is ground with 1000 grit, 1200 grit, 1500 grit and 2000 grit sandpapers in sequence.

7. The method for producing an abrasion-resistant coating on surface of a 3D printed titanium alloy component according to claim 1, wherein the spherical TC4 titanium alloy powder is manufactured by a plasma atomization process.

\* \* \* \* \*